Jan. 12, 1965  O. L. YOUNG  3,165,214
HANDLING DEVICE

Filed June 19, 1962  4 Sheets-Sheet 1

INVENTOR.
OSCAR L. YOUNG
BY
*Teare, Fetzer & Teare*
ATTORNEYS

Jan. 12, 1965   O. L. YOUNG   3,165,214
HANDLING DEVICE
Filed June 19, 1962   4 Sheets-Sheet 2
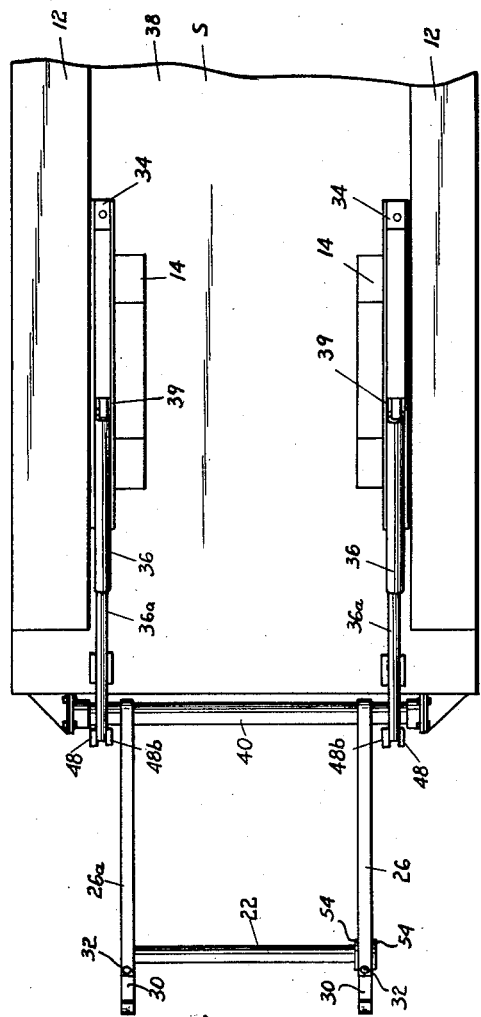
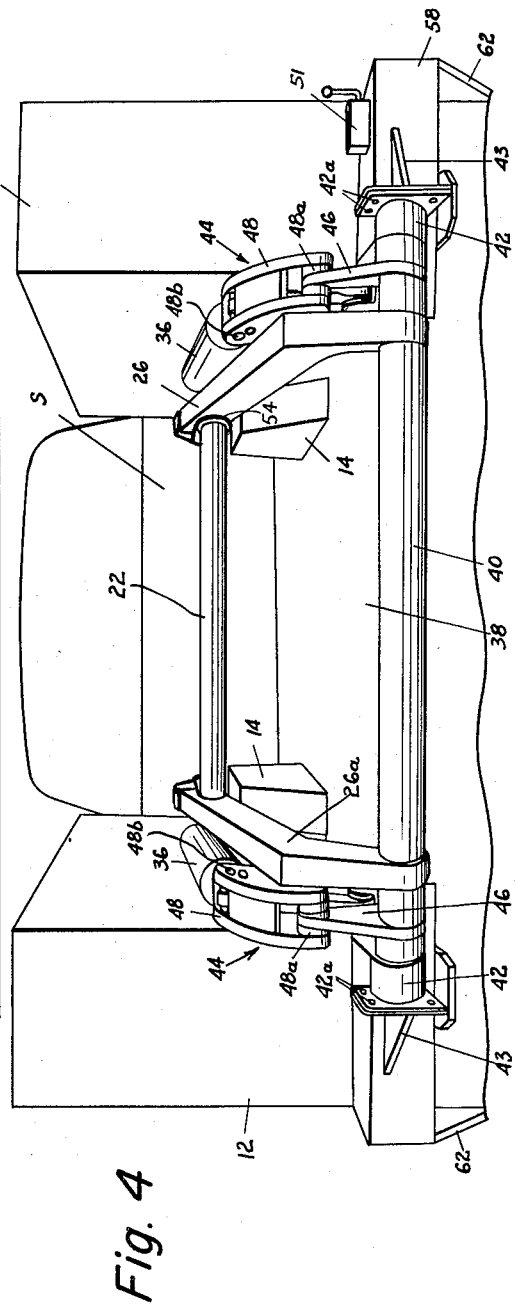
INVENTOR.
OSCAR L. YOUNG
BY
Teare, Fetzer & Teare
ATTORNEYS Jan. 12, 1965 O. L. YOUNG 3,165,214
HANDLING DEVICE
Filed June 19, 1962 4 Sheets-Sheet 3
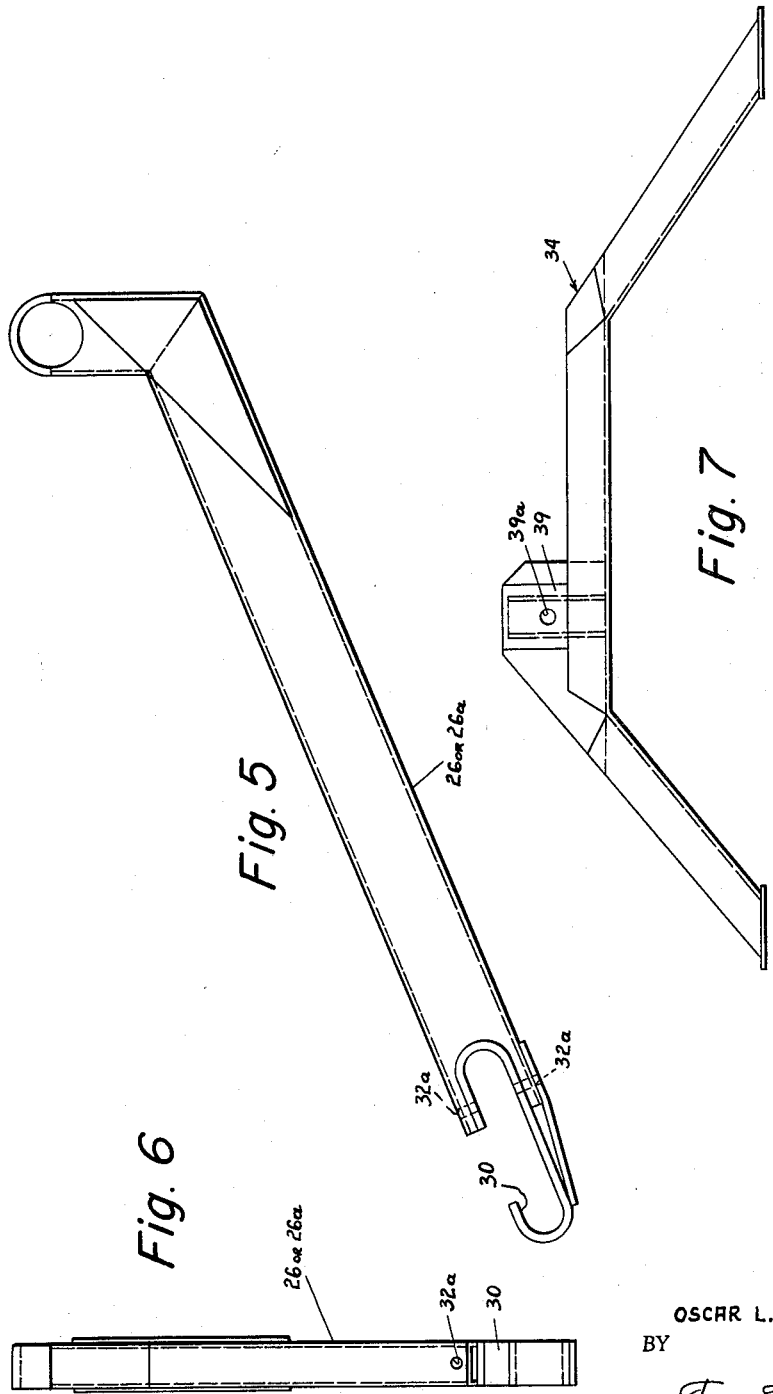
INVENTOR.
OSCAR L. YOUNG
BY
Teare, Tetzer & Teare
ATTORNEYS United States Patent Office 3,165,214
Patented Jan. 12, 1965

3,165,214
HANDLING DEVICE
Oscar L. Young, Griffin, Ga., assignor, by mesne assignments, to The Ohio Brass Company, Mansfield, Ohio, a corporation of New Jersey
Filed June 19, 1962, Ser. No. 203,532
9 Claims. (Cl. 214—77)

This invention relates in general to a handling device, and more particularly to a reel handling device for mounting on a vehicle.

The handling of large reels or coils of wire and the like represent considerable difficulty because of the size or bulkiness of such reels. Reels of wire are conventionally utilized by utility companies for the stringing of power lines and the like, and the loading and unloading of these reels so that they can be transported to and from their location of use is a time consuming and generally expensive operation.

The present invention provides a novel, powered, reel loader adapted for mounting on a vehicle, such as a utility type truck, and which mechanism greatly facilitates the handling of these usually large, bulky reels of material.

Accordingly, an object of the invention is to provide a novel mechanism adapted for mounting on a vehicle for greatly facilitating the handling of large reels or rolls of material, such as reels of wire.

Another object of the invention is to provide a novel mechanism adapted for mounting on a vehicle which mechanism includes swingable reel handling boom or arm means and associated motor and linkage means, for powered, pivotal movement of the arm means through a vertical range of movement of approximately 180° or more, whereby the reel or roll can be readily loaded onto and from the vehicle.

A more specific object of the invention is to provide a vehicle having a reel handling mechanism mounted thereon with such mechanism including projecting boom or arm positions rotatably mounted on the vehicle for swinging movement in a generally vertical plane, and through a range of movement wherein said arm portions project outwardly from the vehicle to a position in which the arm portions overlie the chassis of the vehicle, and including powdered reciprocal motor means and a novel linkage system for so actuating such arm portions.

A still further object of the invention is to provide a reel handling device which is of rugged construction, and is able to quickly and efficiently handle large reels or coils of material, such as reels of wire, and wherein the device may be easily embodied in existing utility vehicle or may be embodied in new utility vehicles.

Other objects and advantages of the invention will be apparent from the following description taken in conjunction with the accompanying drawings, wherein:

FIG. 3 is a top plan view of the FIG. 2 showing;

FIG. 4 is a fragmentary, rear end elevational view of the reel handling mechanism as mounted on a vehicle and with the boom or arm portions of the mechanism disposed in overlying relation to the vehicle chassis by actuation of the associated powered motor means;

FIG. 5 is an enlarged, side elevational view of one of the arms or booms of the reel handling device of the invention;

FIG. 6 is an end elevational view of the arm of FIG. 5, taken from the left thereof;

FIG. 7 is an enlarged side elevational view of a mounting bracket for spanning the rear wheel housings of the vehicle, and utilizable for mounting the handling device on the vehicle, and more particularly represents the means for anchoring the motor means to the vehicle, which motor means is adapted for actuating the handling device;

Figure 1:
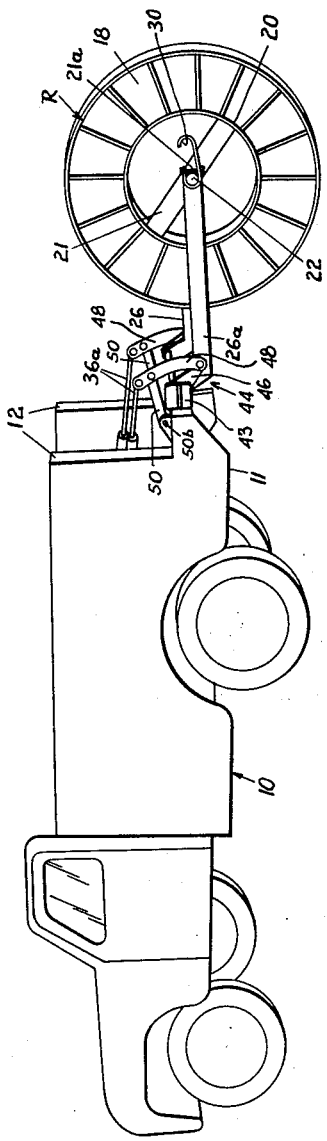
FIG. 1 is a generally side elevational view of a utility type truck embodying the roll or reel handling mechanism of the invention.

Referring now again to the drawings, there is shown a wheeled utility vehicle 10 having a truck body 11 with side walls 12 defining an open topped space S, which may be utilized in carrying materials and the like, applicable to the uses to which the truck is adapted. As best shown in FIG. 3, the space S is interrupted by the rear wheel housing sections 14, which project into the space. The truck chassis may include the structural elements or channels 18 (FIG. 9) which extend lengthwise of the chassis.

Now in accordance with the instant invention, there is provided a powered, handling mechanism mounted, in the embodiment illustrated, on the rear end of the chassis of the vehicle, for greatly facilitating the handling of large reels or rolls R of material, such as reels of wire and the like.

Such reels R conventionally comprise side discs 18 mounted on a tubular axis 20, about which the wire or material is wound, such tubular axis being provided with laterally spaced cross elements 21 which are apertured centrally thereof for receiving therethrough a spindle or rod member 22 (FIGS. 4 and 11) which is adapted for securement to the arms of the handling mechanism, for mounting the reel on such mechanism.

Figure 2:
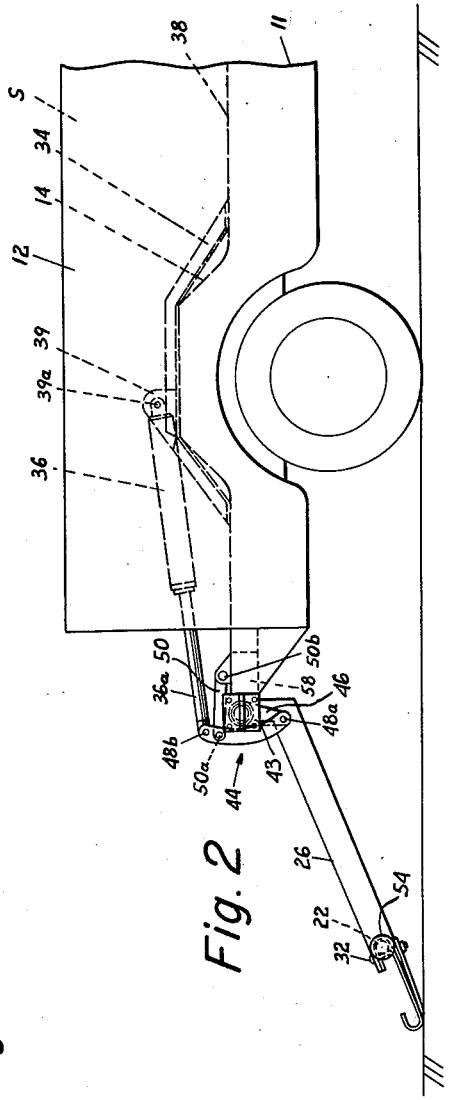
FIG. 2 is a fragmentary, side elevational view illustrating in greater detail the reel handling mechanism of the invention as mounted on a vehicle.

The handling mechanism, in the embodiment illustrated, comprises a pair of transversely spaced boom or arm members 26, 26a of dog leg or generally L-shaped configuration in side elevation, with such arm members being pivoted for movement with respect to the truck chassis, and more particularly for vertical swinging movement through a range of approximately 180° or more, and from a position wherein they extend rearwardly of the truck chassis, as shown for instance in FIG. 2, to a position wherein they overlie the truck chassis, as shown for instance in FIG. 4, and vice versa. Such arm members at their free ends comprise an elongated, open slot structure 30 therein, for receiving the aforementioned spindle or rod 22 for mounting a reel R on the handling mechanism. As best shown in FIG. 2, the arm portions are preferably movable to a position wherein they may generally touch ground level at their free ends, for ready movement beneath the spindle on the reel, whereby upon rotation of such arm portions, such spindle may be received in the slots 30, and may be locked in position in such slots as by means of fastener means 32 (FIG. 2) extending through generally vertically extending or cross openings 32a in the respective arm member.

In the embodiment illustrated, mounting brackets 34 (FIGS. 2, 3, 7) are provided, for anchoring the powered motor means 36, to the truck chassis, which powered motor means are adapted for actuating the handling mechanism. As best shown in FIG. 7, such bracket members 34 comprise a bridge-like structure for spanning the respective rear wheel housing 14 of the vehicle, and which bridging structure is adapted to be anchored by any suitable means, such as welds or fasteners, to the floor 38 of the vehicle body. Each bracket comprises a pivot structure or ears 39 for pivotally mounting as at 39a, one end of the respective motor unit 36.

The aforementioned arm members 26, 26a of the handling mechanism are secured to a rod 40, which is rotatably mounted in spaced trunnion structures 42, preferably detachably secured as at 42a to brackets 43 projecting from the vehicle body. Suitable bearing means may be provided in trunnions 42, for facilitating the rotation of rod 40 in such trunnions.

Linkage mechanism, generally referred to by numeral 44, is provided, a coacting between the piston rod 36a of the respective motor unit and rotatable rod 40, for rotating rod 40 and attached arm members 26, 26a through the range of movement of the handling mechanism.

Figure 12:
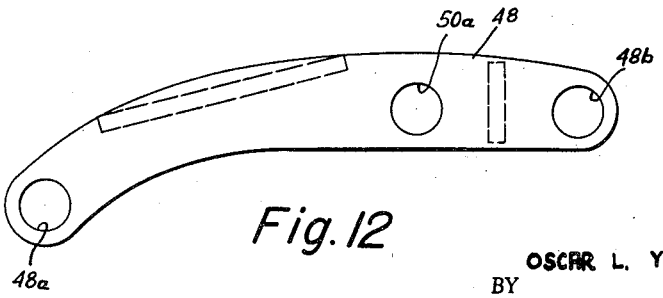
FIG. 12 is an enlarged, elevational view of one of the elements of the linkage mechanism for enabling rotation of the arms of the handling device by the motor means therefor.

Each of such linkage assemblies comprises a crank element 46 secured to rod 40 adjacent one end of the crank, with such crank element extending from the rod 40 in the same general direction of extension as the short section of the respective arm element, and as best shown in FIG. 2. A link assembly 48, of generally arcuate configuration in side elevation (FIG. 12) is pivotally connected as at 48a to the respective crank element 46, and adjacent its other end is pivotally connected as at 48b to the piston rod 36a of the respective motor unit 36. Another link element 50, of generally linear configuration in side elevation, is pivotally connected as at 50a to the respective link 48 and generally adjacent the aforementioned pivotal connection 48b, and the other end of link 50 is then pivotally connected as at 50b to bracket structure on the truck.

Upon retraction of the motor units 36, which motor units are fluid powered, double-acting, reciprocal type units of conventional well known type, the arms may be swung from the position illustrated in FIG. 2 of the drawings to the position illustrated in FIG. 4 of the drawings wherein the arms overlie the chassis of the truck. Housings 14 may provide support for the arms 26, 26a in their stored position. In such position, it will be seen that the handling mechanism is in storage position and is disposed out of interfering relation with the rear end of the truck body.

When a reel of wire or other material is attached to or mounted on such handling mechanism by the aforementioned spindle member 22, such reel can be readily loaded onto the truck into space S of the truck body and can be readily unloaded from space S by selective adjustment of the motor units 36; the reel of material can be held in any desired position with respect to the truck body, either projecting rearwardly thereof or being disposed in elevated position with respect to the floor of the truck body, to thus greatly facilitate removal of the material from the reel, and greatly expediting the handling of the reel in all work operations. It will be noted that the reel, while secured to the arms 26, 26a by spindle 22, may still be rotated on such arm portions.

Motor units 36 may be actuated via a conventional source of pressurized fluid, including a pump and reservoir, located on the vehicle, and as is conventionally found on utility type vehicles. Any suitable control mechanism of conventional well known type may be provided for controlling the direction and application of pressurized fluid to such motor units. A single valve is preferably utilized for controlling both motor units, so that the latter will be simultaneously actuated, for uniform raising and lowering of arms 26, 26a. Such valve may be positioned as at 51 (FIG. 4) on the rear of the truck body for convenient access by an operator.

Figure 11:
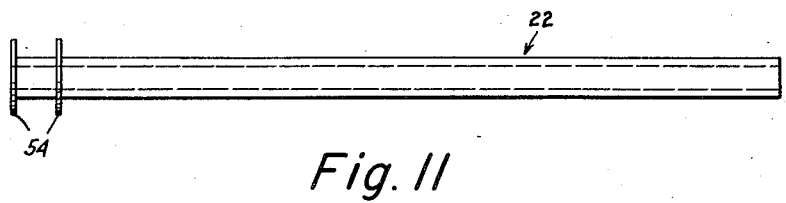
FIG. 11 is an elevational view of a spindle or rod adapted to be inserted through the reel of wire or the like for providing for mounting the reel on the swingable arms of the handling mechanism.

The aforementioned spindle member 22 may comprise a tube or elongated body portion having spaced discs or abutments 54 on one end thereof, and as best shown in FIG. 11. The spacing of such discs is preferably such that they are received on opposite sides of one of the arm members 26 or 26a when the spindle extends between such arm members in slots 30 thereof, thus preventing transverse movement of the spindle out of mounted relationship on such arm members. The aforementioned fastener means 32 prevents movement of the spindle lengthwise of the arm slots 30.

Figure 8:
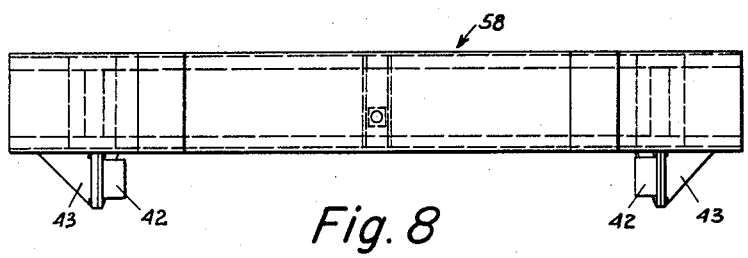
FIG. 8 is a top plan view of a mounting sub-assembly structure adapted for ready attachment to existing utility trucks or to be applied to new utility trucks, for rotatably mounting the boom or arm portions of the handling device on the vehicle.
Figure 9:
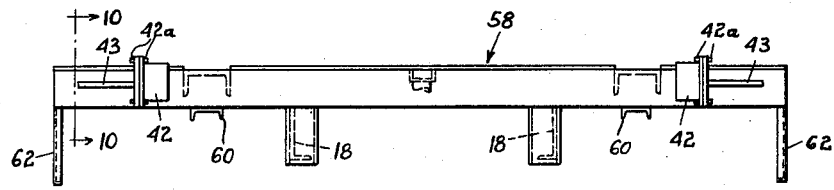
FIG. 9 is a side elevational view of the FIG. 8 subassembly as mounted on the chassis structure of the vehicle.
Figure 10:
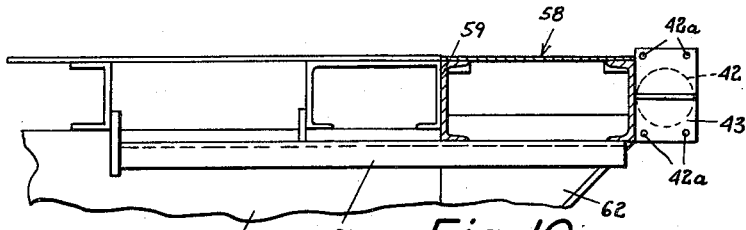
FIG. 10 is an enlarged, fragmentary, sectional elevational view of the FIG. 9 arrangement taken generally along the plane of line 10—10 thereof, and as applied to the chassis of a vehicle.

Referring now in particular to FIGS. 8, 9 and 10, there is shown a sub-assembly 58 which can be readily utilized for attaching the handling mechanism either to new utility trucks, or to existing utility vehicles. Such sub-assembly may comprise the box-like pre-fabricated structure illustrated, having the trunnion members 42 mounted on an outer side face thereof as shown. Such sub-assembly may be readily attached as by welds or fasteners as at 59, to the conventional chassis of a utility type vehicle and elongated channel shaped members 60 may also be utilized, which can be anchored by any suitable means, such as welds, or fasteners, to the conventional chassis structure on the vehicle, which members 60 strengthen such structural arrangement and thus insure adequate strength to mount the handling mechanism on the vehicle, while providing for expeditious location of the rotatable rod 40 of the handling mechanism on the rear of the vehicle. Side plates 62 may also be added to further enhance the appearance and strength of the handling mechanism mounting arrangement.

From the foregoing discussion and accompanying drawings it will be seen that the invention provides a novel handling mechanism for mounting on a vehicle, such as a utility type truck, and which handling mechanism greatly facilitates the handling of large reels or rolls of materials, such as reels of wire and the like, and which provides for readily loading and unloading such reels of material onto and from a vehicle, and for positioning such reels or rolls in any desired position with respect to the vehicle. Such handling mechanism includes fluid powered motor means for actuating the handling mechanism, together with a novel linkage arrangement, which enables the handling mechanism to have a range of movement adequate to provide for any desired positioning of the reel with respect to the vehicle. The invention also provides a handling mechanism which may be readily attached to existing utility type vehicles, or embodied in new utility vehicles, and in a manner whereby the handling mechanism can be moved into a storage position onto the vehicle out of interfering relationship with the end of the vehicle.

The terms and expressions which have been used are used as terms of description and not of limitation, and there is no intention in the use of such terms and expressions of excluding any equivalents or any of the features shown, or described, or portions thereof, and it is recognized that various modifications are possible within the scope of the invention claimed.

I claim:

1. A handling device for loading reels of material, such as reels of wire, onto and from a vehicle and adapted for mounting on the vehicle, said handling device comprising a pair of laterally spaced arm elements of generally L-shaped configuration in side elevation, a rod extending between corresponding ends of said arm elements and being secured thereto, trunnion means pivotally mounting said rod for rotational movement about a generally horizontal axis, means for securing said trunnions to the vehicle, said arm elements including means thereon for securing said arm elements to a reel of material, reciprocal fluid powered motor means, and linkage means extending between said motor means and said rod for rotating said rod about said horizontal axis and thus moving said arm elements in generally vertical planes through a range of movement of approximately 180°, said linkage means comprising a crank element secured to said rod, an arcuate shaped link pivotally coupled at one end to said crank element and projecting upwardly therefrom, the other end of said arcuate shaped link being pivotally coupled to said reciprocal motor means, and another link pivotally coupled to the first link, said other link including means for pivotally coupling the same to the vehicle, the pivotal connection of said other link to said first link being disposed above the pivotal connection of said first link to said crank element throughout the range of movement of said arm elements.

2. A handling device in accordance with claim 1, wherein said means for securing a reel of material to said arm elements comprises a slot in the free end of each of said arm elements, said slots being adapted to receive therein laterally projecting spindle means on the reel.

3. A handling device in accordance with claim 2, including means coacting with each of said slots for locking the reel spindle means in said slots.

4. A handling device in accordance with claim 1, wherein each of said arm elements comprises a short section secured to said rod and projecting generally radially therefrom and a longer section projecting outwardly from said short section, and said crank element projecting in the same general direction of projection as said short section.

5. In combination, a vehicle having a generally flat bed section adapted for carrying material, and a handling device mounted on said vehicle, said handling device being adapted for handling reels of material, such as wire, said handling device comprising laterally spaced arms, means pivotally mounting said arms on said vehicle for pivotal movement in generally vertical planes and from a position wherein said arms project outwardly from the vehicle to a position wherein said arms are disposed in overlying relation to said bed section of the vehicle, and vice versa, means on said arms for detachably securing a reel of material thereto, double acting reciprocal fluid powered motor means anchored at one end to said vehicle, and articulated linkage means mounted on the vehicle for movement in a generally vertical plane, said linkage means coacting between said arms and said motor means and said vehicle for swinging said arms in their vertical planes and with respect to the vehicle upon actuation of said motor means, said linkage means comprising a crank secured to said arms and projecting generally radially outwardly from the pivotal axis of the means pivotally mounting said arms on said vehicle, an arcuate shaped link adjacent one end thereof being pivotally secured to said crank, and pivotally secured adjacent its other end to said motor means, and a further link pivotally secured to the first mentioned link intermediate the pivotal connections of said first mentioned link to said crank and to said motor means, and having means thereon adapted for pivotally securing said further link to the vehicle.

6. The combination in accordance with claim 5, wherein said means on said arms for securing a reel thereto comprises recesses in said arms, a spindle disposed in said recesses and extending transversely between said arms, said spindle being adapted to extend axially of a reel to mount the latter on said arms, and means for locking said spindle in said recesses.

7. A handling device for loading and unloading reels of material onto and from a vehicle comprising, laterally spaced arm members, means on said arm members for mounting a reel of material thereon, means for pivotally mounting said arm members on the vehicle for pivotal movement in generally vertical planes, powered motor means for pivotally and simultaneously actuating said arm members, linkage means coacting between said motor means and said arm members for so actuating said arm members upon actuation of said motor means, said arm members being of L-shaped configuration in side elevation and comprising a generally short section and a generally longer section, rod means extending between said short sections of said arm members and being secured thereto, said rod means being rotatably mounted in said pivotal mounting means, said pivotal mounting means comprising hollow trunnions receiving said rod means therein, means for detachably securing said trunnions to a vehicle, and wherein said linkage means comprises a crank secured to said rod means and projecting outwardly therefrom in the same general direction of projection as said short section, an arcuate shaped link adjacent one end being pivotally secured to said crank and pivotally secured at its other end to said motor means, and a further link pivotally secured to the first mentioned link and having means thereon adapted for pivotally securing said further link to the vehicle.

8. A handling device for loading and unloading reels of material onto and from a vehicle comprising, laterally spaced arm members, means on said arm members for mounting a reel of material thereon, means for pivotally mounting said arm members on the vehicle for pivotal movement in generally vertical planes, fluid-powered reciprocal motor means for simultaneously pivoting said arm members, means for movably mounting said motor means on the vehicle, linkage means coacting between said motor means and said arm members for so actuating said arm members upon actuation of said motor means to thus move said arm members in said generally vertical planes through a predetermined range of pivotal movement, said linkage means comprising a crank element secured to said arm members in laterally disposed relation whereby said arm members will clear said motor means when said arm members are pivoted to storage position on the vehicle, a first link pivotally coupled to said crank element and projecting upwardly therefrom, said first link being pivotally connected to said reciprocal motor means, another link pivotally coupled to said first link intermediate the couplings of said first link to said crank element and to said motor means, and said other link including means for pivotally coupling the same to the vehicle.

9. A handling device for loading and unloading reels of material onto and from a vehicle comprising laterally spaced arm members, means on said arm members for mounting a reel of material thereon, means for pivotally mounting said arm members on the vehicle for pivotal movement in generally vertical planes, fluid powered reciprocal motor means for simultaneously pivoting said arm members, linkage means coacting between said motor means and said arm members for so actuating said arm members upon actuation of said motor means to thus move said arm members in said generally vertical planes through a predetermined range of pivotal movement, said linkage means comprising a crank element secured to said arm members, a first link pivotally coupled to said crank element and projecting therefrom, said first link being pivotally connected to said reciprocal motor means, another link pivotally coupled to said first link intermediate the couplings of said first link to said crank element and to said motor means, said other link including means for pivotally coupling the same to the vehicle, and wherein said first link is of arcuate shape in side elevation and projects upwardly from said crank element, the pivotal connection of said other link to said first link being disposed above the pivotal connection of said first link to said crank element throughout the range of movement of said arm members.

References Cited in the file of this patent

UNITED STATES PATENTS 2,876,916    Austrow _____ Mar. 10, 1959
3,056,516    Cole _____ Oct. 2, 1962